(12) United States Patent
Ferchland et al.

(10) Patent No.: US 9,398,533 B2
(45) Date of Patent: Jul. 19, 2016

(54) TRANSMITTING DATA BETWEEN NODES OF A WIRELESS NETWORK (75) Inventors: Tilo Ferchland, Dresden (DE); Sascha Beyer, Medingen (DE); Michael Schmidt, Dresden (DE)

(73) Assignee: Atmel Corporation, San Jose, CA (US)

( * ) Notice: Subject to any disclaimer, the term of this patent is extended or adjusted under 35 U.S.C. 154(b) by 52 days.

(21) Appl. No.: 13/287,637

(22) Filed: Nov. 2, 2011

(65) Prior Publication Data

US 2012/0106529 A1 May 3, 2012

Related U.S. Application Data (60) Provisional application No. 61/409,845, filed on Nov. 3, 2010.

(30) Foreign Application Priority Data

Nov. 3, 2010 (DE) .......................... 10 2010 050 118

(51) Int. Cl.
*H04W 52/02* (2009.01)
*H04W 28/22* (2009.01)
*H04W 84/10* (2009.01)
*H04W 92/18* (2009.01)
*H04W 4/00* (2009.01)
*H04W 56/00* (2009.01)

(52) U.S. Cl.
CPC ............ *H04W 52/0229* (2013.01); *H04W 4/00* (2013.01); *H04W 56/00* (2013.01); *H04W 28/22* (2013.01); *H04W 84/10* (2013.01); *H04W 92/18* (2013.01)

(58) Field of Classification Search
CPC . H04W 52/0229; H04W 28/22; H04W 84/10; H04W 92/18; H04W 4/00; H04W 56/00
See application file for complete search history.

(56) References Cited

U.S. PATENT DOCUMENTS

| 5,805,925 | A | * | 9/1998 | Blackwell et al. | ............... 710/11 |
| 2001/0034209 | A1 | * | 10/2001 | Tong et al. | ....................... 455/69 |
| 2003/0212815 | A1 | * | 11/2003 | Tzeng et al. | ................... 709/236 |
| 2005/0128998 | A1 | * | 6/2005 | Jelitto et al. | .................... 370/349 |
| 2006/0018268 | A1 | * | 1/2006 | Kakani et al. | .................. 370/278 |
| 2008/0259785 | A1 | * | 10/2008 | Truong et al. | .................. 370/217 |

FOREIGN PATENT DOCUMENTS

| CN | 101243665 | 8/2008 |
| DE | 102005026093 | 12/2006 |

OTHER PUBLICATIONS

Office Action and English Translation for German Patent Application DE 10 2010 050 118.2, Jul. 1, 2011.

(Continued)

*Primary Examiner* — Alpus H Hsu
*Assistant Examiner* — Walter Divito
(74) *Attorney, Agent, or Firm* — Fish & Richardson P.C.

(57) ABSTRACT

In one embodiment, setting, by a first node, a settable data rate for a first part of a data frame, the data frame also having a second part having a defined second data rate, and transmitting, by the node, the first part at the set data rate and the second part at the second data rate, the first part including at least a portion of a payload of the data frame and the second part including an identifier based on the set data rate.

23 Claims, 3 Drawing Sheets (56) References Cited

OTHER PUBLICATIONS

Holma, Harri et al, Editors, "WCDMA for UMTS, Radio Access for Third Generation Mobile Communications," Chichester: Wiley, p. 80-91, 2001.

"Part 15.4: Wireless Medium Access Control (MAC) and Physical Layer (PHY) Specifications for Low-Rate Wireless Personal Area Networks (WPANs)," *IEEE Std 802.15.4<sup>TM</sup>*-2006, Sep. 8, 2006.

Taiwanese Office Action in Taiwanese Application No. 100140203, dated Jun. 25, 2015, 15 pages (with English translation).

\* cited by examiner

TRANSMITTING DATA BETWEEN NODES OF A WIRELESS NETWORK

RELATED APPLICATIONS

This application claims the benefit, under 35 U.S.C. §119(e), of U.S. Provisional Patent Application No. 61/409,845, filed 3 Nov. 2010. This application also claims the benefit, under 35 U.S.C. §119(a), of German Patent Application No. 102010050118.2-35, also filed 3 Nov. 2010.

TECHNICAL FIELD

This disclosure relates to transceivers and wireless networks.

BACKGROUND

A transceiver is a device that has both a transmitter and a receiver that are combined and may share common circuitry or a single housing.

DESCRIPTION OF EXAMPLE EMBODIMENTS

A specification for a wireless network is known from the IEEE 802.15.4 industry standard PART 15.4: WIRELESS MEDIUM ACCESS CONTROL (MAC) AND PHYSICAL LAYER (PHY) SPECIFICATIONS FOR LOW-RATE WIRELESS PERSONAL AREA NETWORKS (WPANs), IEEE Std 802.15.4™-2006. The wireless network typically comprises a plurality of nodes, each having a transceiver for the communication of the nodes among each other. Each transceiver comprises a transmitter and a receiver. WPANs may be used for the wireless transmission of information over relatively short distances, such as approximately 10 meters. Contrary to Wireless Local Area Networks (WLANs), WPANs require little or even no infrastructure to transmit data, so that small, simple, energy-efficient, and cost-effective devices may be implemented for a wide range of applications.

The IEEE 802.15.4 standard specifies low-rate WPANs, which, at raw data rates of 250 kbit/s and using stationary or mobile devices, are suited for applications in industrial monitoring and control, in sensor networks, in automation, in the field of computer peripherals, and for interactive games. In addition to the device being very simple and cost-effective to implement, an extremely low power requirement of the devices is of critical importance for such applications. Thus, the standard strives for a battery life of several months to several years.

The IEEE 802.15.4 standard specifies a band spread at a chip rate of $f_C=2$ Mchip/s and offset Quaternary Phase Shift Keying (QPSK) modulation at a symbol rate of $f_S=62.5$ ksymbol/s at the PHY layer, in the virtually globally available 2.4 GHz Industrial, Scientific, Medical (ISM) band for raw data rates of $f=250$ kbit/s. IEEE 802.15.4-2006 at 47, et seq.

In an 802.15.4 transmitter for the ISM band, the data stream to be transmitted is first converted to a sequence of pseudo noise (PN) sequences. For this purpose, the data stream to be transmitted is first converted into what is referred to as symbols, wherein each symbol is assigned exactly one value having a fixed bit width, such as four bits. In each symbol period, $T_S=1/f_S=16$ μs, thus four bits of the data stream are used to select a PN sequence from a sequence set of a total of 16 PN sequences. In this way, each symbol composed of four bits is assigned a symbol value-specific PN sequence composed of 32 binary chips, chip period $T_C=T_S/32=500$ ns$=1/f_C$, which is transmitted instead of the four bits. The sequence set of 16 "quasi-orthogonal" PN sequences specified in the standard comprises a first group of eight first PN sequences, which differ from one another only by a cyclic shift of the chip values thereof, and a second group of eight second PN sequences, which differ from one another only by a cyclic shift of the chip values thereof and which each differ from one of the first PN sequences only by an inversion of each second chip value. See IEEE Standard 802.15.4-2006. The temporal length of a symbol corresponds to the duration of the transmission of all chips of the assigned PN sequence, wherein the first and last chips of a PN sequence adjoin the front or rear boundary of the symbol respectively.

The PN sequences assigned to the successive symbols are strung together and then offset QPSK modulated by modulating, with half-sine pulse shaping, the chips with even indices (0, 2, 4, . . . ) on the in-phase (I) carrier and the chips with odd indices (1, 3, 5, . . . ) on the quadrature-phase (Q) carrier. To form an offset, the Q chips are delayed by one chip period, $T_C$, with respect to the I chips. See IEEE 802.15.4-2006. The transmitter then spectrally shifts the modulated PN sequences in one of the transmission channels and subsequently amplifies them for transmission.

A receiver of a receiving node receives the transmitted radio signal by means of an antenna. The receiver converts the received signal, comprised of the received radio signal according to the IEEE 802.15.4 standard, into the data without faults to the extent possible. The receiver, inter alia, filters the received signal, transforms it into the baseband, demodulates the signal, and detects the data. If band spreading takes place on the transmitter side using the transmitter-side sequences, the band spreading is reversed on the receiver side by corresponding despreading using receiver-side sequences. Each receiver-side sequence is assigned to a transmitter-side sequence and may be derived therefrom, or each receiver-side sequence may be identical to a transmitter-side sequence. If the chips of the transmitter-side sequences, for example, are two logical values of zero and one or equivalent thereto, the two antipodal values ±1, typically the sequences used in the receiver, are those the chips that have exactly two different values, such as zero and one or ±1.

A transceiver for a data transmission system according to the IEEE 802.15.4 industry standard is known from U.S. Publication No. 2010/0254304 (which claims priority to German Application No. DE 102005026093.4). The transceiver comprises an antenna and a transmitter connected to the antenna for transmitting data. The transmitter is designed to assign to each data symbol a PN sequence from a sequence set that comprises a first group of first PN sequences and a second group of second PN sequences. The first and second PN sequences differ from one another within the respective size only by a cyclic shift of the chip values. The second group comprises a corresponding second PN sequence for each first PN sequence, with the second PN sequence differing from the first PN sequence only by inversion of every second chip value. The transceiver comprises a receiver that is connected to the antenna and has a differential demodulator and a detection unit for detecting symbols contained in a differentially demodulated signal. The detection unit comprises a sequence providing unit for providing a third group of sequences derived (from the first and second sequences). The detection unit comprises a correlation unit, which is connected to the sequence providing unit and designed to calculate correlation results by correlating the differentially demodulated signal with each of the derived sequences of the third group. The detection unit comprises an evaluation unit, which is connected to the correlation unit and designed to derive the values of the symbols by evaluating the correlation results.

Figure 1:
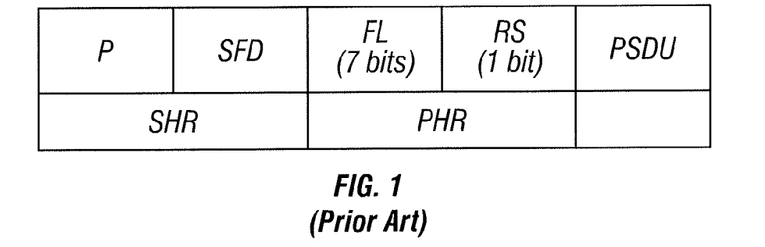
FIG. 1 is an example data frame according to IEEE 802.15.4 industry standard.

The IEEE 802.15.4-2006 standard discloses a data frame for standard-conforming transmission. IEEE 802.15.4-2006 at 22. An illustration is shown in FIG. 1. The data frame may be divided into three parts: a synchronization header (SHR), a physical header (PHR), and a physical service data unit (PSDU) field. The SHR comprises a preamble P and a start-of-frame delimiter (SFD). The PHR has a frame length (FL) and a reserved bit (RS).

The SHR allows the receiver to synchronize for the detection of subsequent data. The receiver uses the preamble to carry out at least one chip synchronization and a symbol synchronization for the incoming received signal by means of a sequence that is known on the receiver-side, such as a PN sequence. Based on the preamble, a time basis comprising sampling times of the chips and the symbol boundaries is determined in the receiver. In the synchronized state of the receiver, the synchronizations that are carried out form the time basis, wherein the receiver may receive subsequent data by means of the time basis. In the received signal, the SFD follows the PDSU field, the data of which may be demodulated and detected by means of the time basis.

Figure 2:
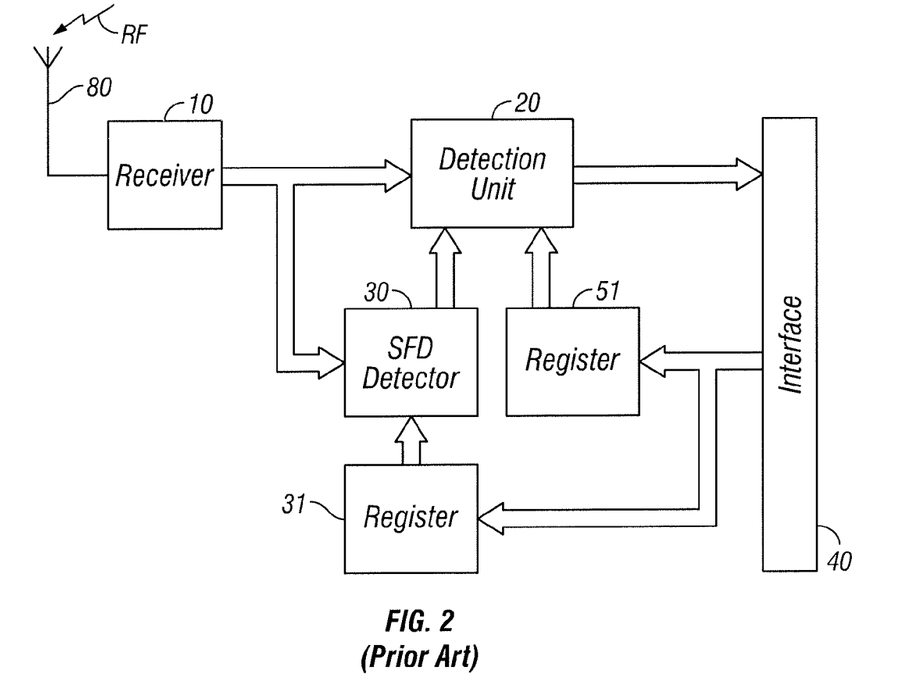
FIG. 2 shows an example receiver for the IEEE 802.15.4 industry standard.

FIG. 2 shows an example circuit of a transceiver of a node of a wireless network. The circuit comprises a receiver 10 that is connected to an antenna 80. In particular embodiments, components of the receiver 10 may include an analog amplifier, a mixer, a filter, an analog-to-digital converter, and a differential demodulator. A detection unit 20 is connected to the output of the receiver 10. In particular embodiments, the detection unit comprises a correlation unit and an evaluation unit as well as a sequence providing unit connected to the correlation unit. A differentially demodulated signal travels from the receiver 10 to an input of the detection unit 20. Symbols contained in the differentially demodulated signal are detected by the detection unit 20. In particular embodiments, the signal present in the chip clock is first correlated in the correlation unit with receiver-side sequences, which are provided to the detection unit 20 by the sequence providing unit. This leads to correlation results that represent a measure of the agreement of the signal with the respective receiver-side sequence. The evaluation unit of the detection unit 20 evaluates the correlation results and outputs the data to the interface 40. By means of the register 51, the detection unit 20 may be set via the interface 40.

The example circuit of FIG. 2 further comprises a SFD detector 30, which compares the receiver-side value of the SFD to the value of the SFD in the received data stream. In particular embodiments, the receiver-side value of the SFD, for example, may be implemented as a standard-conforming sequence of 1 1 1 0 0 1 0 1. IEEE 802.15.4-2006 at 44. In particular embodiments, the receiver-side value may be programmed in a register 31 by means of the interface 40. If the receiver-side value of the SFD agrees with the value of the SFD in the data stream, the SFD detector 30 actuates the detection unit 20 to detect the data PSDU following the SFD.

Particular embodiments provide a method for transmitting data between nodes of a wireless network.

Particular embodiments provide a method for transmitting data between a first node and a second node of a wireless network.

In particular embodiments, the first node transmits a data frame comprising a first part and a second part. The data frame is a unit to be transmitted. The first part may comprise a preamble, which enables synchronization of the receiving second node. In particular embodiments, the second part of the data frame contains payload to be transmitted. In particular embodiments, the second part of the data frame additionally has an address, wherein the address indicates the destination node for which the data of the data frame is intended. The second part of the data frame follows the first part, so that buffering of the second part is not required.

In particular embodiments, the first part of the data frame has a predefined first data rate. In particular embodiments, for example, the first data rate may be specified in the wireless network by hardware implementation. In particular embodiments, the predefined first data rate may be predefined by programming notably a register value. In particular embodiments, a second data rate of the second part of the data frame may be set. In particular embodiments, the second data rate is set independently of the first data rate. The second data rate may be set to a value that is different from the first data rate. In particular embodiments, if standard-conforming transmission is to take place, the second data rate and the first data rate may be set to the same value. In particular embodiments, the first node sets the second data rate. The second data rate is set by the first node independently of the second node. In particular embodiments, agreement between the first node and the second node on the second data rate to be used is not required for each individual transmission. In particular embodiments, the values of the second data rates that may be used by the nodes of the wireless network may be set in a device of the wireless network in all nodes or may be implemented in a fixed manner in the transceivers.

In particular embodiments, an identifier is transmitted from the first node in the first part of the data frame. The identifier may be assigned to the set second data rate in the second part of the data frame. In particular embodiments, for the assignment, an assignment of value may be provided in the first node and in the second node, which may unambiguously assign a defined data rate to a defined value of the identifier.

In particular embodiments, the first node transmits data at the set second data rate in the second part of the data frame. The second node determines the identifier in the received first part. The second node determines the identifier before receiving the second part of the data frame. The second node determines the data in the received second part of the data frame based on the determined identifier. In particular embodiments, an adaptation of a detection to the second data rate is controlled based on the determined identifier.

Figure 3:
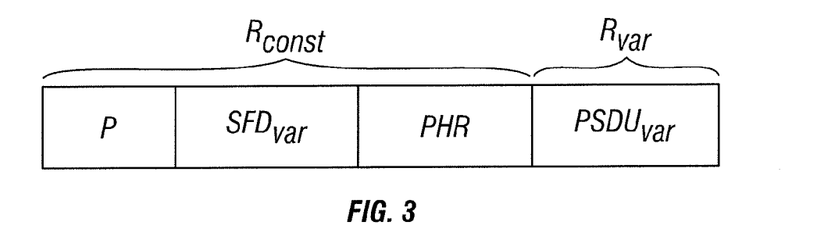
FIG. 3 is a schematic illustration of an example embodiment of a data frame.
Figure 4:
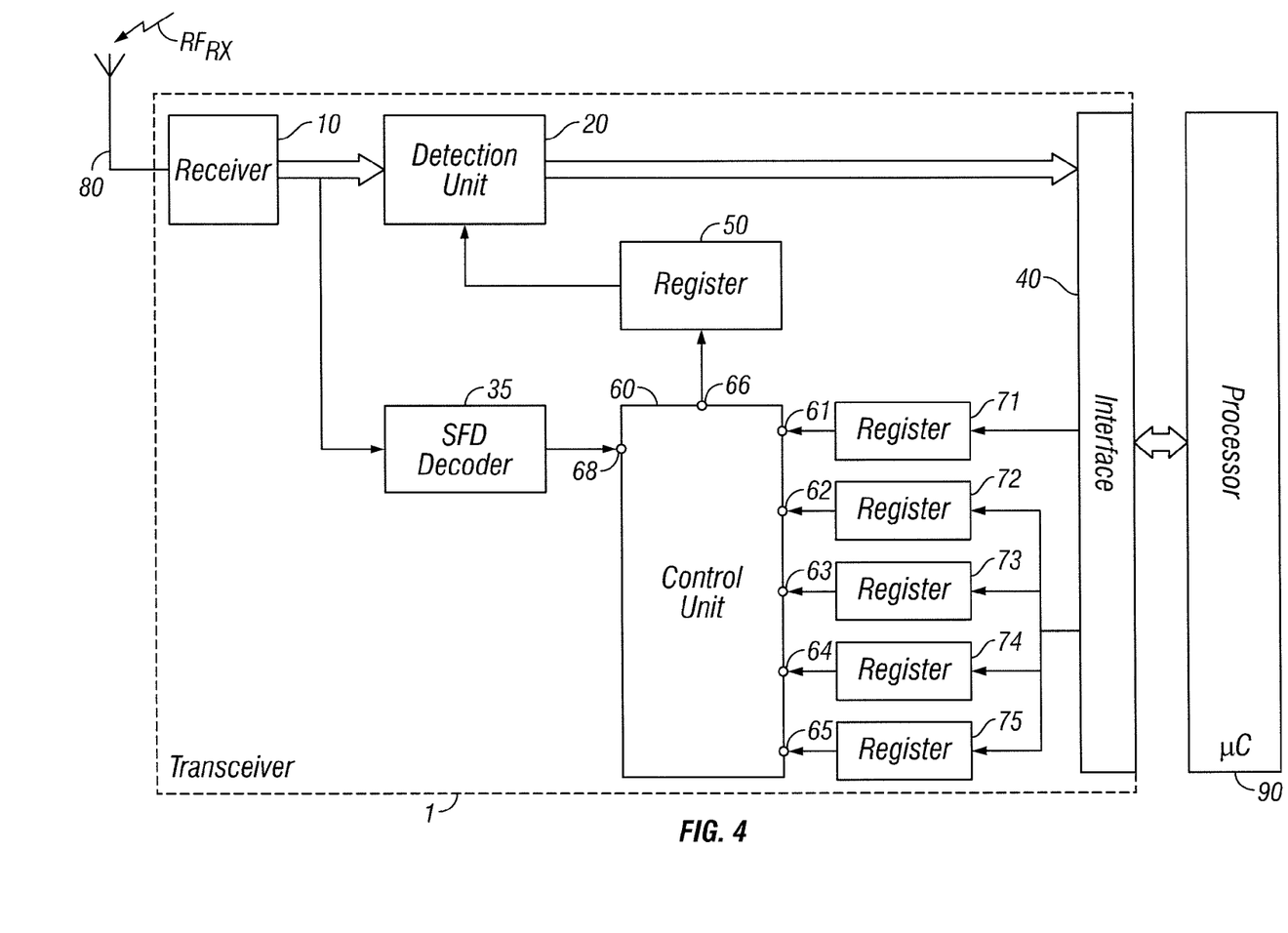
FIG. 4 is a schematic illustration of an example embodiment of a transceiver.
Figure 5:
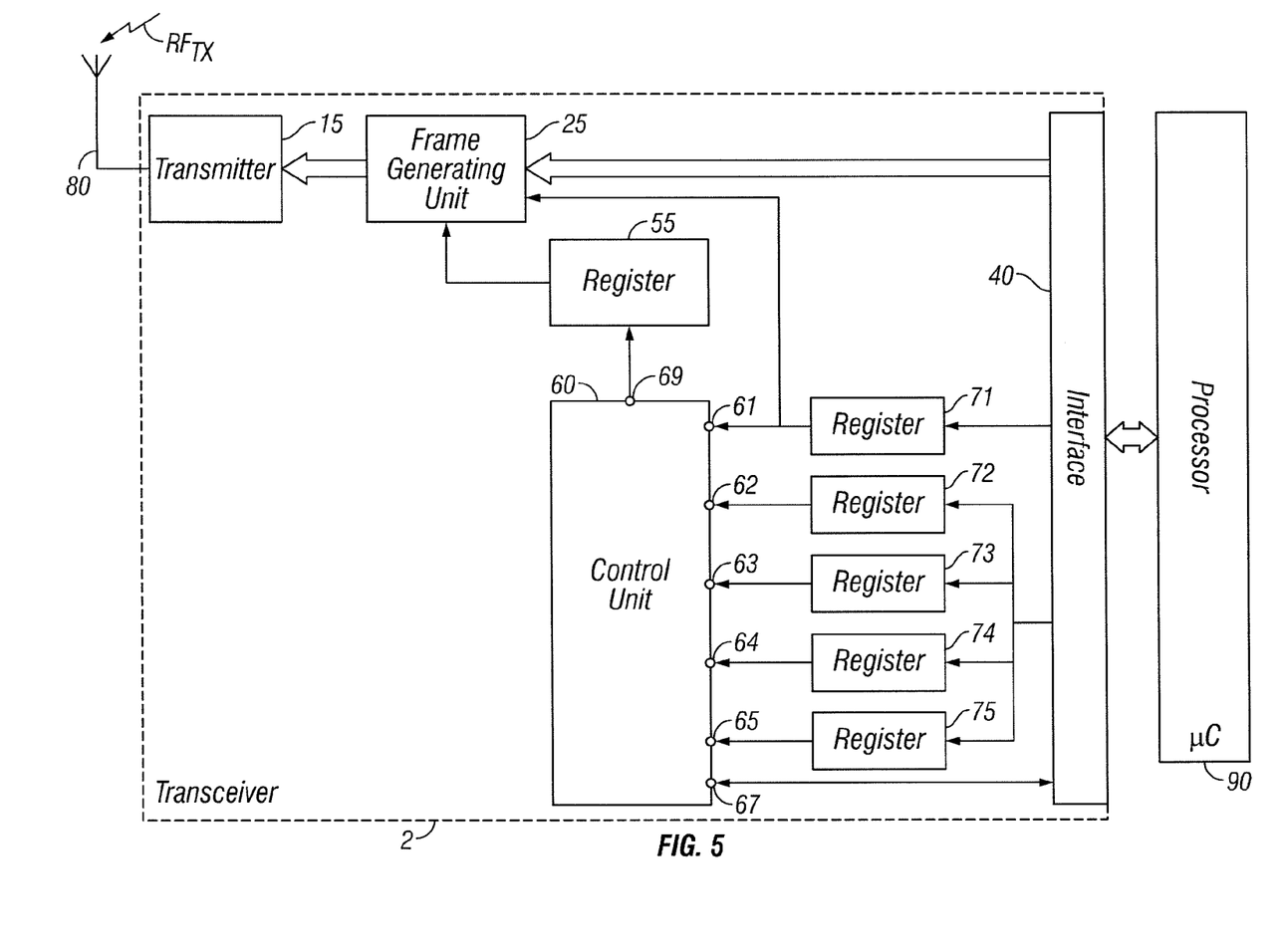
FIG. 5 is a schematic illustration of another example embodiment of a transceiver.

In particular example embodiments shown in FIG. 3, 4, or 5, the change in the data rate may be initiated by one node alone so that no complex matching of the second data between the nodes is required during operation of the wireless network. In particular embodiments, the data rate may be changed "on the fly" without having to interrupt or reconfigure the communication in the wireless network. In particular embodiments, the hardware implementation in the integrated transceivers may be particularly easy because of the predefined set of second transmission rates, between which, only a switch may be required.

Particular embodiments provide a circuit of a transceiver of a node of a wireless network.

Particular embodiments provide a transceiver of a node of a wireless network for receiving data frames.

In particular embodiments, the transceiver comprises a determination unit for determining an identifier in a first part of a received data frame. In particular embodiments, the first part of the data frame has a predefined first data rate. In particular embodiments, for example, the first data rate may be specified in the transceiver by hardware implementation. In particular embodiments, the predefined first data rate may be predefined by programming a register value in a configuration register of the transceiver.

In particular embodiments, the transceiver comprises a detection unit for determining data in a second part of a received data frame. In particular embodiments, the second part of the data frame has a second data rate. In particular embodiments, the second data rate is established by the transmitting node and must be determined by the transceiver of the receiving node to detect the data.

In particular embodiments, the identifier is assigned to the second data rate. In particular embodiments, the assignment of an identifier value of the identifier to the second data rate may be known to both a transmitting node and to a receiving node.

In particular embodiments, the transceiver comprises a control unit, which is connected to the determination unit and to the detection unit. The control unit is equipped to control a detection that is adapted to the second data rate by the detection unit based on the determined identifier. In particular embodiments, the control unit comprises a digital comparator, which compares the received identifier to predefined stored or hardware-implemented identifier values and adapts it to the detection depending on the comparison.

Particular embodiments provide a transceiver of a node of a wireless network for transmitting data frames.

In particular embodiments, the transceiver may comprise a frame generating unit for generating a data frame to be transmitted, which includes a first part and a second part. The frame generating unit is equipped to insert data to be transmitted in the second part of the data frame.

In particular embodiments, the transceiver may comprise a control unit, which is connected to the frame generating unit for controlling the frame generating unit. In particular embodiments, the control unit may be equipped to set a second data rate in the second part of the data frame by controlling the frame generating unit. In particular embodiments, the frame generating unit is equipped to generate the first part of the data frame having a predefined first data rate and the second part of the data frame having the set second data rate. In particular embodiments, the frame generating unit is equipped to insert an identifier assigned to the second data rate in the first part of the data frame.

In particular embodiments, both transceivers explained above may be combined with one another, wherein the same transceiver may be equipped both to receive and to transmit the data frame comprising the first part and the second part. In particular embodiments, the transceiver may comprise one control unit for controlling the detection unit and for controlling the frame generating unit. In particular embodiments, for example the transceiver may comprise a connection for connecting to an antenna so that the antenna is designed on a circuit board and connected to the connection. In particular embodiments, the transceiver may comprise a digital interface for connecting to a processor, such as a microcontroller.

In particular embodiments, the transceiver comprises a configuration register connected to the control unit for storing a configuration value. The configuration value is assigned to the second data rate. In particular embodiments, the second data rate may be predefined in the wireless network by programming the configuration value in the configuration register. In particular embodiments, for programming purposes, the configuration register is connected to the interface. In particular embodiments, the detection unit or the frame generating unit may be controlled by means of the configuration value in the configuration register.

In particular embodiments, the transceiver comprises a plurality of registers that are connected to the control unit for storing a control value and an identifier value assigned to the control value. In particular embodiments, each control value may be assigned to a settable second data rate. The detection unit or the frame generating unit may be controlled by means of the control value. In particular embodiments, a spreading factor of a bandspread may be controlled by the frame generating unit or despreading may be controlled by the detection unit using the control value.

In particular embodiments, the control unit may be equipped to compare the identifier determined from the received data stream to the identifier value. In particular embodiments, for control purposes, the control unit may be equipped to output the control value assigned to the identifier value when the identifier value and the determined identifier agree with one another.

In particular embodiments, each register or the configuration register may be programmed via the interface. In particular embodiments, the second data rates may be adapted for all requirements in the wireless network.

In particular embodiments, the transceiver comprises a SFD detector for determining the identifier from a received data stream. In particular embodiments, the identifier may be determined independently of the detection unit, so that the detection unit is deactivated as long as no valid identifier has been ascertained. In particular embodiments, the reliability of the detection of data may be increased.

In particular embodiments, the control unit may be equipped to abort the reception of the data frame if the determined identifier in the first part of the received data frame does not agree with one of the values in one of the register.

In particular embodiments, the data frame comprises a preamble for the first part and a preamble for the second part. In particular embodiments, this may create the effect that one synchronization for the data frame is required so that the power consumption of the receiving node may be minimized.

In particular embodiments, the first part of the data frame and the second part of the data frame may have the same modulation. In particular embodiments, this may create the effect that no separate synchronization or setting of the modulation/demodulation are required for the first part and for the second part.

In particular embodiments, the first part and the second part of the data frame are transmitted at the same transmission frequency. In particular embodiments, this may create the effect that the second part of the data frame may be transmitted immediately after the first part of the data frame, whereby switching times are avoided.

Particular embodiments may be combined with one another. Particular embodiments, including several combinations are explained in the description of the example embodiments of the figures.

FIG. 3 shows an example schematic illustration of a data frame for wireless transmission. In particular embodiments, a data frame may be present the Open Systems Interconnection (OSI) model. In particular embodiments, the data frame of FIG. 3 comprises a first part $R_{const}$ and a second part $R_{var}$. In particular embodiments, further parts may be provided (not shown). In the first part $R_{const}$, one and the same data frame has a predefined first data rate, and in the second part $R_{var}$, one and the same data frame has a settable second data rate. Accordingly, $PSDU_{SFvar}$ data is transmitted in the second part $R_{var}$ of the data frame at the set data rate. In particular embodiments, depending on the setting, the second data is the same as the first data rate or different from the first data rate. In particular embodiments, at least one second data rate may be set that is different from the first data rate.

In FIG. 3, the second part $R_{var}$ of the data frame immediately follows the first part $R_{const}$ in the data frame. The first part $R_{const}$ the data frame comprises a preamble P, a physical header PHR, and an identifier $SFD_{var}$. In particular embodiments, the header PHR may also be part of the second part $R_{var}$ of the data frame. In particular embodiments, the preamble P may be used for synchronization of the receiving node, for example chip synchronization, of both the first part $R_{const}$ and of the second part $R_{var}$ of the data frame. In particular embodiments, the data frame comprises a preamble P for both the first part $R_{const}$ and a preamble P for the second part $R_{var}$. In particular embodiments, the power consumption of the receiving node may be minimized by requiring only one synchronization for the first part $R_{const}$ and the second part $R_{var}$ of the data frame. In particular embodiments, the first part $R_{const}$ of the data frame and the second part $R_{var}$ of the data frame have the same modulation. Particular embodiments having the same modulation in the first part and in the second part of the data frame requires no separate synchronization or setting of the modulation demodulation for the first part $R_{const}$ and for the second part $R_{var}$. In particular embodiments, the first part $R_{const}$ and the second part $R_{var}$ of the data frame are transmitted at the same transmission frequency. Using the same transmission frequency enables the second part $R_{var}$ of the data frame to be transmitted immediately after the first part $R_{const}$ of the data frame because there is no switching time between two frequencies. The total length of the data frame influencing the power consumption is minimized by using the same transmission frequency for the first part $R_{const}$ and the second part $R_{var}$. In particular embodiments, in order to set the second data rate in the second part $R_{var}$ of the data frame, the spreading factor may be changed.

In particular embodiments, the identifier $SFD_{var}$ may be assigned to the set second data rate in the second part $R_{var}$ of the data frame. In particular embodiments, the identifier $SFD_{var}$ specifies the data rate at which the transmission of the subsequent $PSDU_{SFvar}$ data takes place in the second part $R_{var}$ of the data frame already in the first part $R_{const}$ of the data frame. In FIG. 3, the identifier $SFD_{var}$ is also a start-of-frame delimiter $SFD_{var}$ and may be used to synchronize the receiving node with the received data stream.

In particular embodiments, the data frame in FIG. 3 may be used in a method for transmitting data between a first node and a second node of a wireless network. In particular embodiments, the first node transmits the data frame comprising a first part $R_{const}$ and the second part $R_{var}$. In particular embodiments, the first part $R_{const}$ has a predefined first data rate, specified or programmable, and the second part $R_{var}$ has a settable second data rate. In particular embodiments, "predefined" denotes that the first data rate is known to the transmitting node and receiving node, for example, by a corresponding unit of the wireless network.

In particular embodiments, the first part $R_{const}$ may additionally contain an address, which the second node may compare to its own identification. In particular embodiments, if the address does not agree with its own identification, for example, the reception of the current data frame by the second node may be aborted, because the data frame is obviously not intended for the second node, but instead, for example, for another node in the wireless network.

In particular embodiments, the first node sets the second data rate for the second part $R_{var}$ of the data frame. In particular embodiments, for example, the second data rate may be set during a program flow of a processor, such as a microcontroller. In particular embodiments, the setting of the second data rate may be initiated by input of a user. The second data rate is set by changing a spreading factor (spreading factor=chip rate/bit rate). In particular embodiments, the spreading factor may be changed between the values 1 and 8 (using the values of a power of two, such as 1, 2, 4, 8). In particular embodiments, for example, during an offset QPSK (O-QPSK) modulation in the 2450 MHz band, at a spreading factor of 8, each of the symbols to be transmitted may be converted at a bit width of 4 bits in a PN sequence having 32 chips. This corresponds to the standard-conforming data rate of 250 kbits/s. With a spreading factor of 8, the method may be backward compatible with the IEEE 802.15.4-2006 industry standard for the spreading factor of 8. In particular embodiments, the spreading factor of 8 is provided as the default value.

In particular embodiments, with a spreading factor of 1, one chip may be transmitted for each bit. In particular embodiments, with a spreading factor of 1, the $PSDU_{SFvar}$ data in the second part $R_{var}$ of the data frame may be transmitted at a non-standard-conforming data rate of 2 Mbit/s. In particular embodiments, the second data rate may be the same as or different from the first data rate. In particular embodiments, the (differential) modulation may be the same for both parts $R_{const}$, $R_{var}$ of the data frame. In particular embodiments, the change from the first data rate to the second data rate takes place precisely at the transition between the first part $R_{const}$ and the second part $R_{var}$ of the data frame.

For switching the spreading factor, particular embodiments are provided sequences having different lengths from which the transmitting node selects. In particular embodiments, for example, for a spreading factor of 8, a 32-chip sequence may be selected; for a spreading factor of 4, a 16-chip sequence may be selected; for a spreading factor of 2, an 8-chip sequence may be selected; and for a spreading factor of 1 for 4 bits, a 4-chip sequence may be selected by the transmitting node by switching. In particular embodiments, the receiving node correlates the incoming data stream with the sequence having the corresponding length, by means of a correlator. In particular embodiments, depending on a measurement value determined by the receiving node, such as a received signal quality, an error frequency or distance from the transmitting node, the spreading factor may be adjusted. In particular embodiments, the spreading factor may be adjusted adaptively.

In particular embodiments, based on the setting process, the first node transmits an identifier $SFD_{var}$ in the first part $R_{const}$ of the data frame. In particular embodiments, the identifier $SFD_{var}$ is assigned to the set second data rate in the second part $R_{var}$ of the data frame. In particular embodiments, the identifier A7 (hex.), or the standard-conforming sequence 1 1 1 0 0 1 0 1, is transmitted as the start-of-frame delimiter $SFD_{var}$ with a standard-conforming spreading factor of 8. In particular embodiments, for example, with a spreading factor of 1, the non-standard-conforming sequence 0 1 0 1 1 1 0 1 is transmitted as the identifier $SFD_{var}$.

In particular embodiments, in the second part $R_{var}$ of the data frame, the first node transmits the $PSDU_{SFvar}$ data at the set second data rate. In particular embodiments, the stringed sequences are modulated on a carrier signal.

In particular embodiments, the second node determines the identifier $SFD_{var}$ in the received first part $R_{const}$ of the data frame. In particular embodiments, if the identifier $SFD_{var}$ is of not associated with any of the data rates known to the receiving node, the reception of the current frame may be aborted. In particular embodiments, if the second node associates the identifier $SFD_{var}$ with a data rate, the second node determines the data $PSDU_{SFvar}$ in the received second part $R_{var}$, of the data frame based on the determined identifier $SFD_{var}$.

In particular embodiments, if a data frame is received that requires acknowledgement (ACK), the ACK is likewise transmitted at the second data rate in the ACK frame.

FIG. 4 shows an example schematic illustration of a block diagram of a transceiver 1 of a node of a wireless network. FIG. 4 shows example function blocks that may be used for receiving a data frame, some of which, as is shown in FIG. 5, may also be used for transmitting a data frame.

In particular embodiments, the transceiver 1 of FIG. 4 is connected to an antenna 80 for receiving a radio signal $RF_{RX}$, wherein the radio signal $RF_{RX}$ contains a data frame, which is shown in the example schematic illustration of FIG. 3. Moreover, the transceiver 1 is connected by means of the bidirectional interface 40 thereof to a processor 90, such as a microcontroller (μC). Particular embodiments of transceiver 1 of FIG. 4 execute the functions of at least the physical layer of the OSI model.

In particular embodiments, the transceiver 1 comprises an analog and digital receiver (RX) 10 that may perform one or more of the following functions of amplification, conversion, filtering, analog-to-digital conversion, and demodulation. In particular embodiments, the first part $R_{const}$ of the data frame and the second part $R_{var}$ of the data frame have the same modulation. In particular embodiments, the receiver 10 is equipped to demodulate the first part $R_{const}$ and the second part $R_{var}$ of the data frame by means of the same demodulation. In particular embodiments, the first part $R_{const}$ of the data frame and the second part $R_{var}$ of the data frame are transmitted at the same transmission frequency.

In particular embodiments, the demodulated output signal of the receiver 10 reaches the input of a connected detection unit 20 and the input of a connected SFD decoder 35. In particular embodiments, if the detection unit 20 is set to the correct second data rate in the second part $R_{var}$ of the data frame, the detection unit 20 detects the data $PSDU_{SFvar}$ in the second part $R_{var}$ of the data frame at the correct second data rate and forwards the corresponding bits to the interface 40 for further processing in higher layers of the OSI model by the processor 90. In particular embodiments, for example, the interface 40 may be a serial peripheral interface (SPI).

In particular embodiments, in order to set the correct second data rate, the SFD decoder 35 first determines a start-of-frame delimiter $SFD_{var}$ in a first part $R_{const}$ of the data frame of preceding the second part $R_{var}$, wherein the start-of-frame delimiter $SFD_{var}$ has the double function of serving as an identifier $SFD_{var}$ for the second data rate. In particular embodiments, the start-of-frame delimiter $SFD_{var}$ may be used both for the chip and symbol synchronization of the receiving transceiver 1 and for setting the detection unit 20 to the second date. In particular embodiments, the start-of-frame delimiter decoder 35 may at the same time be a determination unit for determining the identifier $SFD_{var}$ for the second data rate.

In particular embodiments, the start-of-frame delimiter $SFD_{var}$ determined by the SFD decoder 35 reaches an input 68 of a control unit 60. In particular embodiments, the control unit 60 is equipped to compare the determined start-of-frame delimiter $SFD_{var}$ to identifier values in the registers 72, 73, 74, 75 present at the inputs 62, 63, 64, 65 of the control unit. In particular embodiments, for example, register 72 may store an identifier value and a control value for a second data rate of 250 kbit/s. In particular embodiments, if the identifier value agrees with the start-of-frame delimiter $SFD_{var}$, the control unit 60 loads the control value from register 72 into register 50 and outputs the value to the detection unit 20. In particular embodiments, the detection unit 20 is controlled by the control value for detection that is adapted to the second data rate of 250 kbit/s, for a spreading factor of 8. In particular embodiments, for example, register 73 may store an identifier value and a control value for a second data rate of 500 kbit/s, for a spreading factor of 4. In particular embodiments, for example, register 74 may store an identifier value and a control value for a second data rate of 1 Mbit/s, for a spreading factor of 2. In particular embodiments, for example, register 75 may store an identifier value and a control value for a second data rate of 2 Mbit/s, for a spreading factor of 1. In particular embodiments, the identifier value may consist of 2 bits. In particular embodiments, data $PSDU_{SFvar}$ in the second part $R_{var}$ of the data frame may be received at the second data rates of 250 kbit/s (identifier value 00), 500 kbit/s (identifier value 01), 1 Mbit/s (identifier value 10), and 2 Mbit/s (identifier value 11). In particular embodiments, instead of the registers 72 to 75, the values for several data rates may be established by hard-wiring. In particular embodiments, the identifier values between switching may be specified and may not be programmed.

In particular embodiments, the control unit 60 is equipped to activate and deactivate the switching between the second data rates. In particular embodiments, if the switching between the second data rates is deactivated, the control unit 60 uses a configuration value and a start-of-frame delimiter $SFD_{var}$, which are stored in the configuration register 71 and are present at the input 61 of the control unit 60.

In particular embodiments, the configuration register 71 may store the configuration value assigned for controlling a second data rate. In particular embodiments, the second data rate is defined in the wireless network by programming the configuration value in the configuration register 71 as the standard in the wireless network when switching is deactivated between the second data rates. In particular embodiments, the detection unit 20 may be controlled by means of the configuration value upon deactivation of the switching.

In particular embodiments, the configuration value and the start-of-frame delimiter $SFD_{var}$ may be programmed in the configuration register 71 by means of the interface 40.

In particular embodiments, for example, values conforming with the industry standard may be programmed in the configuration register 71.

In particular embodiments, the standard-conforming value may be copied from the configuration register 71 into register 50 when the values in registers 72 to 75 are the same to enable backward compatibility with the standard. In particular embodiments, switching between different second data rates is not possible. In particular embodiments, if only some of the values in registers 72 to 75 are different, a priority decision may be made. In particular embodiments, the number of possible second data rates may be reduced to a predefinable amount.

FIG. 5 is an example schematic illustration of function blocks of a transceiver 2 for transmitting a data frame. In particular embodiments, the transceiver 2 is connected to a processor 90 by means of an interface 40. In particular embodiments, data to be transmitted reaches the frame generating unit 25 from the processor 90 via the interface 40. In particular embodiments, the frame generating unit 25 is equipped to generate a data frame, shown in FIG. 3, comprising a first part $R_{const}$ and a second part $R_{var}$, so that all chips of stringed sequences are output at the output of the frame generating unit 15. In particular embodiments, the chips are modulated by a transmitter 15, mixed to a carrier signal, and output to an antenna 80 after being amplified by an output amplifier of the transmitter 15, wherein the antenna 80 emits the radio signal $RF_{TX}$. In particular embodiments, transmitter 15 is equipped to transmit the first part $R_{const}$ of the data frame and the second part $R_{var}$ of the data frame at the same transmission frequency. In particular embodiments, transmitter 15 may be equipped to transmit the first part $R_{const}$ of the data frame and the second part $R_{var}$ of the data frame at the same modulation as well. In particular embodiments, transmitter 15 is equipped to set the second data rate of the second part $R_{var}$ of the data frame exclusively by varying the spreading factor.

In particular embodiments, the data rate of the second part $R_{var}$ of the data frame may be set by means of the configuration value of the configuration register 71. In particular embodiments, the configuration value in the configuration register 71 is assigned to a default data rate. In particular embodiments, for example, this may be a second data rate that is predefined for the installed wireless network. In particular embodiments, the configuration value may also be hard-wired. In particular embodiments, for example, the configuration value may correspond to a standard-conforming value. In FIG. 5, processor 90 may program possible actuations of the second part $R_{var}$ of the data frame as control values for registers 72 to 75.

In particular embodiments, the programmed control values enable the control unit 60 to set the second data rate in the second part $R_{var}$ of the data frame independently of the processor 90 and independently of higher protocol layers. In particular embodiments, the control unit 60 loads the associated control value required for the second data rate from one of the registers 72 to 75 via the output 69 into register 55. In particular embodiments, depending on the register value in register 55, the frame generating unit 25 switches the associated sequences for the selected second data rate. In particular embodiments, a plurality of function blocks, such as the interface 40, the control unit 60, and the registers 71, 72, 73, 74, 75, are used for both reception according to the transceiver 1 and transmission according to the transceiver 2.

This disclosure is not limited to the example embodiments shown in FIGS. 3 to 5. Particular embodiments provide other data rates. Particular embodiments utilize other frequency ranges, such as the 868 MHz/915 MHz band. Particular embodiments according to FIGS. 4 and 5 may be used for a universal radio system.

The following is a list of reference symbols and numbers in FIGS. 1 to 5, provided for example illustration purposes only and not by way of limitation:

| | |
|---|---|
| 1, 2 | Transceiver |
| 10, RX | Receiver |
| 15, TX | Transmitter |
| 20 | Detection unit |
| 25 | Frame generating unit |
| 30, 35 | Start-of-frame delimiter decoder, SFD decoder, determination unit |
| 40 | Interface |
| 31, 50, 51, 55, 71, 72, 73, 74, 75 | Register |
| 60 | Control unit |
| 61, 62, 63, 64, 65, 66, 67, 68, 69 | Connection |
| 80 | Antenna |
| 90 | Processor, microcontroller |

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   setting a defined data rate for a first part of a data frame and a settable data rate for a second part of the data frame, the first part including a start-of-frame delimiter configured to serve as both:
      a delimiter between the first and second parts of the data frame; and
      an identifier specifying the settable data rate for the second part of the data frame,
   wherein setting the settable data rate comprises:
      loading a control value from one of a plurality of control registers each storing a respective control value; and
      setting the settable data rate based on the loaded control value;
   transmitting the first part at the defined data rate and the second part, following the first part, at the settable data rate, the second part including at least a portion of a payload of the data frame;
   receiving another data frame having a first part and a second part, the first part of the another data frame including another start-of-frame delimiter;
   determining the another start-of-frame delimiter in the first part of the another data frame;
   setting a detector to correspond to another settable data rate specified in the determined another start-of-frame delimiter; and
   detecting at least a portion of a payload in the second part of the determined another data frame at the another settable data rate.

2. The method of claim 1, further comprising:
examining an identifier in the received first part of the another data frame for the another start-of-frame delimiter for synchronizing the another data frame; and
determining the at least a portion of the payload in the received second part of the data frame based on the examined identifier.

3. The method of claim 2, further comprising:
if the received another data frame requires acknowledgement, then transmitting an acknowledgement frame with a defined data rate for a first part of the acknowledgement frame and a settable data rate for a second part of the acknowledgment frame, at least the second part of the acknowledgement being based on the examined identifier.

4. The method of claim 1, wherein the first part of the data frame further comprises a preamble for minimizing synchronization required for the data frame;
wherein the second part of the data frame comprises a destination address indicating a destination node for the data frame.

5. The method of claim 1, wherein the settable data rate of the data frame is different from the defined data rate.

6. The method of claim 1, wherein setting the settable data rate comprises changing a spreading factor of a bandspread.

7. The method of claim 1, further comprising:
switching, based on the control value, associated sequences for the settable data rate.

8. The method of claim 1, wherein setting a detector to correspond to the settable data rate comprises:
comparing, by a controller, the determined another start-of-frame delimiter to identifier values stored in respective control registers, each control register storing an identical value and a corresponding control value for a corresponding data rate;
determining, by the controller, that a particular identifier value in a particular control register of the control registers agrees with the determined another state-of-frame delimiter;
loading, by the controller, the corresponding control value of the particular identifier value from the particular control register; and
outputting, by the controller, the corresponding control value to the detector.

9. A device comprising:
a transceiver configured to:
set a defined data rate of a first part of a data frame and a settable data rate for a second part of the data frame, the first part including a start-of-frame delimiter configured to serve as both:
a delimiter between the first and second parts of the data frame; and
an identifier specifying the settable data rate for the second part of the data frame;
transmit the first part at the defined data rate and the second part, following the first part, at the settable data rate, the second part including at least a portion of a payload of the data frame, wherein the transceiver comprises a plurality of control registers for storing respective control values and is configured to set the settable data rate by loading a particular control value from one of the plurality of control registers and setting the settable data rate based on the particular control value;
receive another data frame having a first part and a second part, the first part of the another data frame including another start-of-frame delimiter;
determine the another start-of-frame delimiter in the first part of the another data frame;
set a detector to correspond to another settable data rate specified in the determined another start-of-frame delimiter; and
detect at least a portion of a payload in the second part of the determined another data frame at the another settable data rate.

10. The device of claim 9, further comprising:
a processor coupled to the transceiver by a digital interface, the processor configured to cause the transceiver to set the settable data rate of the second part of the data frame.

11. The device of claim 10, wherein the digital interface comprises a bidirectional interface.

12. The device of claim 9, wherein the second part of the another data frame has the another settable data rate, and wherein the transceiver is further configured to:
examine an identifier in the first part of the another data frame for the another start-of-frame delimiter for synchronizing the another data frame with the transceiver; and
determine the at least a portion of the payload of the another data frame in the second part of the another data frame based on the examined identifier.

13. The device of claim 12, wherein the transceiver is further configured to:
if the received another data frame requires acknowledgement, then transmit an acknowledgement frame with a defined data rate for a first part of the acknowledgement frame and a settable data rate for a second part of the acknowledgement frame, at least the second part of the acknowledgement being based on the examined identifier.

14. The device of claim 9, wherein the first part of the data frame further comprises a preamble for minimizing synchronization required for the data frame, and
wherein the second part of the data frame comprises a destination address indicating a destination node for the data frame.

15. The device of claim 9, wherein the settable data rate is different from the defined data rate.

16. The device of claim 9, wherein the transceiver is configured to set the detector to correspond to the settable data rate by:
comparing the determined another start-of-frame delimiter to identifier values stored in respective control registers, each control register storing an identical value and a corresponding control value for a corresponding data rate;
determining that a particular identifier value in a particular control register of the control registers agrees with the determined another state-of-frame delimiter;
loading the corresponding control value of the particular identifier value from the particular control register; and
outputting the corresponding control value to the detector.

17. A system comprising:
an antenna;
a transceiver coupled to the antenna, the transceiver configured to:
set a defined data rate of a first part of a data frame and a settable data rate for a second part of the data frame, the first part including a start-of-frame delimiter configured to serve as both:
a delimiter between the first and second parts of the data frame; and
an identifier specifying the settable data rate for the second part of the data frame; and transmit the first part at the defined data rate and the second part, following the first part, at the settable data rate, the second part including at least a portion of a payload of the data frame, wherein the transceiver comprises a plurality of control registers for storing respective control values and is configured to set the settable data rate by loading a particular control value from one of the plurality of control registers and setting the settable data rate based on the particular control value; and a processor coupled to the transceiver by a digital interface, the processor configured to cause the transceiver to set the settable data rate of the second part of the data frame, wherein the transceiver is further configured to:

receive another data frame having a first part and a second part, the first part of the another data frame including another start-of-frame delimiter;

determine the another start-of-frame delimiter in the first part of the another data frame;

set a detector to correspond to another settable data rate specified in the determined another start-of-frame delimiter; and detect at least a portion of a payload in the second part of the determined another data frame at the another settable data rate.

18. The system of claim 17, wherein the digital interface comprises a bidirectional interface.

19. The system of claim 17, wherein the second part of the another data frame has the another settable data rate, and wherein the transceiver is further configured to:

examine an identifier in the first part of the another data frame for the another start-of-frame delimiter for synchronizing the another data frame with the transceiver; and determine the at least a portion of the payload of the another data frame in the second part of the another data frame based on the examined identifier.

20. The system of claim 19, wherein the transceiver is further configured to:

if the received another data frame requires acknowledgement, then transmit an acknowledgement frame with a defined data rate for a first part of the acknowledgement frame and a settable data rate for a second part of the acknowledgement frame, at least the second part of the acknowledgement being based on the examined identifier.

21. The system of claim 17, wherein the second part of the data frame comprises a destination address indicating a destination node for the data frame.

22. The system of claim 17, wherein the settable data rate is different from the defined data rate.

23. The system of claim 17, wherein the transceiver is configured to set the detector to correspond to the settable data rate by:

comparing the determined another start-of-frame delimiter to identifier values stored in respective control registers, each control register storing an identical value and a corresponding control value for a corresponding data rate;

determining that a particular identifier value in a particular control register of the control registers agrees with the determined another state-of-frame delimiter;

loading the corresponding control value of the particular identifier value from the particular control register; and outputting the corresponding control value to the detector.

* * * * *